(12) United States Patent
Lee et al.

(10) Patent No.: US 6,834,974 B2
(45) Date of Patent: Dec. 28, 2004

(54) LAMP ASSEMBLY, BACKLIGHT ASSEMBLY AND LIQUID CRYSTAL DISPLAY APPARATUS HAVING THE SAME

(75) Inventors: Sang-Duk Lee, Yongin-si (KR); Kyu-Seok Kim, Yongin-si (KR); Jin-Ho Ha, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 10/410,425

(22) Filed: Apr. 9, 2003

(65) Prior Publication Data

US 2003/0235052 A1 Dec. 25, 2003

(30) Foreign Application Priority Data

Jun. 25, 2002 (KR) .......................................... 2002-35716

(51) Int. Cl.⁷ ................................................ F21V 8/00
(52) U.S. Cl. .......................... 362/31; 362/223; 362/224
(58) Field of Search ............................. 362/31, 29, 235, 362/249, 217, 225, 223, 224; 349/70, 61, 161

(56) References Cited

U.S. PATENT DOCUMENTS

| | | | | |
|---|---|---|---|---|
| 5,315,211 A | * | 5/1994 | Ditlevsen et al. | 315/50 |
| 6,441,874 B1 | * | 8/2002 | Saito et al. | 349/70 |
| 6,515,433 B1 | * | 2/2003 | Ge et al. | 315/227 R |
| 6,601,961 B1 | * | 8/2003 | Masaki | 362/26 |

* cited by examiner

*Primary Examiner*—Thomas M. Sember
(74) *Attorney, Agent, or Firm*—Cantor Colburn LLP

(57) ABSTRACT

A lamp assembly, a backlight assembly and a LCD apparatus having the same are provided. The lamp assembly includes a lamp for emitting a light and a lamp holder for receiving one end of the lamp and for emitting a portion of the light emitted from the end of the lamp. The lamp holder has a transparent or semi-transparent material. The backlight assembly includes a light guiding plate for guiding the light emitted from the lamp and the lamp holder and for emitting the guided light and a receiving container for receiving the lamp assembly and the light guiding plate. Accordingly, the dark portion corresponding to the electrodes of the lamp may be reduced and brightness of the backlight assembly may be enhanced.

24 Claims, 10 Drawing Sheets

LAMP ASSEMBLY, BACKLIGHT ASSEMBLY AND LIQUID CRYSTAL DISPLAY APPARATUS HAVING THE SAME

BACKGROUND OF THE INVENTION

1. Field of the Invention

The present invention relates to a lamp assembly, a backlight assembly and a liquid crystal display (LCD) apparatus having the same, and more particularly to a lamp assembly to enhance dark portion generated by electrodes of a lamp in the lamp assembly, to a backlight assembly and a liquid crystal display (LCD) apparatus having the same.

2. Description of the Related Art

LCD apparatuses display image by reflecting external light transmitted through a LCD panel or by using a light source, i.e. a backlight assembly, disposed on the rear surface of the LCD panel, instead of generating light by itself.

The backlight assembly includes a lamp for generating light, a light guiding plate for guiding the light generated from the lamp toward the LCD panel, a reflection plate (or a reflector) disposed under the light guiding plate to reflect the light leaked from the light guiding plate toward the light guiding plate, and optical sheets for enhancing brightness of the light transmitted from the light guiding plate.

The light guiding plate of the backlight assembly has a flat type backlight assembly and a wedge type backlight assembly according as the position of the lamps concerning the light guiding plate. The lamps are disposed at both end portions of the light guiding plate in the flat type backlight assembly, and lamps are disposed at one end portion of the light guiding plate in the flat type backlight assembly.

Figure 1:
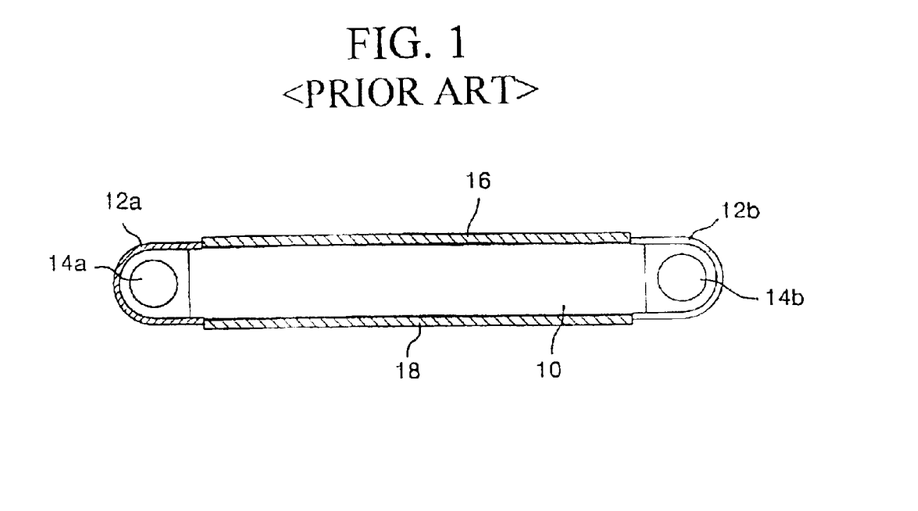
FIG. 1 is a cross-sectional view showing a conventional flat type backlight assembly.

FIG. 1 is a cross-sectional view showing a conventional flat type backlight assembly.

Referring to FIG. 1, lamp receiving containers (or lamp reflectors) 12a and 12b are disposed at both ends of the light guiding plate 10, and prevent leakage of the light generated by lamps 14a and 14b. The lamps 14a and 14b are disposed inside of the lamp receiving containers 12a and 12b, and generate light. The light guiding plate 10 receives light from the lamps 14a and 14b and guides the light toward a diffusion sheet 16. A reflection plate 18 is disposed on the lower surface of the light guiding plate 10, and reflects the light leaked from the lower surface of the light guiding plate 10 toward the light guiding plate 10. The light guiding plate 10 in the backlight assembly is made of a high polymer such as Polymethyl Methacrylate (PMMA) or Cyclic Olefin Polymer (COP), to thereby have a high density. Accordingly, the light guiding plate is the heaviest one of all elements in the LCD module. The wedge type light guiding plate is used in the LCD of notebook computer more usually than the flat type light guiding plate because the notebook computer needs a lighter and thinner LCD.

Figure 2:
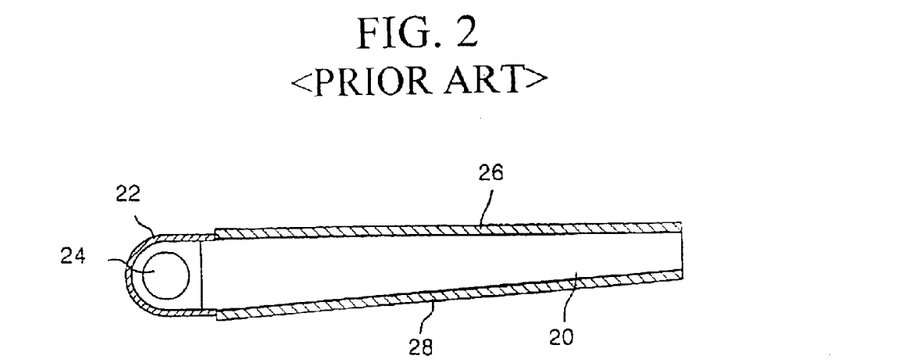
FIG. 2 is a cross-sectional view showing a conventional wedge type backlight assembly.

FIG. 2 is a cross-sectional view showing a conventional wedge type backlight assembly.

Referring to FIG. 2, a lamp receiving container (or a lamp reflector) 22 is disposed at one end of a light guiding plate 20, and prevents leakage of the light generated by a lamp 24. The lamp 24 is disposed inside of the lamp receiving container 22, and generates light. The light guiding plate 20 receives light from the lamp 24 and guides the light toward a diffusion sheet 26. A reflection plate 28 is disposed on the lower surface of the light guiding plate 20, and reflects the light leaked from the lower surface of the light guiding plate 20 toward the light guiding plate 20.

Figure 3:
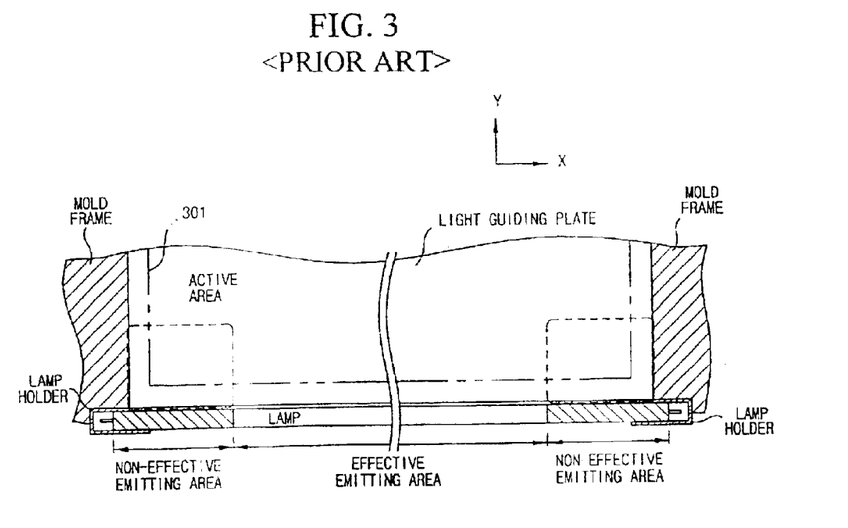
FIG. 3 is a schematic view showing an effective and non-effective luminous area of a conventional backlight assembly.

FIG. 3 is a schematic view showing effective and non-effective luminous areas of a conventional backlight assembly.

Referring to FIG. 3, since a lamp holder not only supports a lamp but also prevents fluctuation of a light guiding plate, when the light guiding plate is pushed in a Y-direction by external impulse and vibration, the lamp holder is disposed adjacent to an effective display area (or active area) that is bounded by the dotted line 301. Accordingly, this causes dark portions, which are formed at portions of the LCD panel corresponding to electrodes of the lamp, to deteriorate displaying quality.

A non-effective emitting area of the lamp is extended to the effective display area, to thereby overlap with the effective display area due to the limited space of the backlight assembly when disposing the lamp in the backlight assembly. This is a main reason to cause the dark portions.

There are some approaches to reduce the dart portions. One approach reduces the length of the non-effective emitting area of the lamp by shortening the length of the electrodes of the lamp. Another approach forms predetermined patterns to change the path of the light incident from the lamp on the lower surface of the light guiding plate, especially on the lower surface adjacent to a corner portion of the light guiding plate, so as to change the path of the light incident from the lamp. However, these approaches cannot reduce the dark portion when the width of the LCD module decreases.

BRIEF SUMMARY OF THE INVENTION

The present invention provides a lamp assembly for enhancing the brightness of light by reducing the dark portions corresponding to the electrodes of a lamp.

The present invention further provides a backlight assembly having a lamp assembly capable of enhancing light brightness by reducing dark portions in the lamp assembly.

The present invention further provides an LCD apparatus having a backlight assembly capable of reducing dark portions in the backlight assembly to enhance light brightness.

In one aspect of the invention, a lamp assembly comprises a lamp comprising a first electrode, disposed on a first end of the lamp, for receiving a first electric power, and a second electrode, disposed on a second end of the lamp, for receiving a second electric power, the lamp emitting a light in response to the first and second electric power, and a lamp holder for receiving the first end or the second end of the lamp and for emitting the light.

In another aspect, a backlight assembly comprises a lamp assembly comprising a lamp emitting a first light and a lamp holder for receiving one end of the lamp, the lamp holder receiving the first light emitted from the lamp to emit a second light, a light guiding means for guiding the first light emitted from the lamp and the second light emitted through the lamp holder to emit a third light, and a receiving container for receiving the lamp assembly and the light guiding means.

In further aspect, an LCD apparatus comprises a backlight unit comprising a lamp assembly having a lamp holder for receiving one end of a lamp which emits a light in response to an external electric power, the lamp holder emitting a portion of the light emitted from the lamp, a light guiding means for guiding the light emitted from the lamp and the lamp holder, and a receiving container for receiving the lamp assembly and the light guiding means, and a display unit for displaying an image in response to the light emitted from the backlight assembly.

According to the lamp assembly, backlight assembly and LCD apparatus having the same, the dark portions generated by the lamp holder may be removed and the brightness of the light may be enhanced by using a transparent or semi-transparent lamp holder that receives both ends of the lamp.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF PREFERRED EMBODIMENTS

Figure 4:
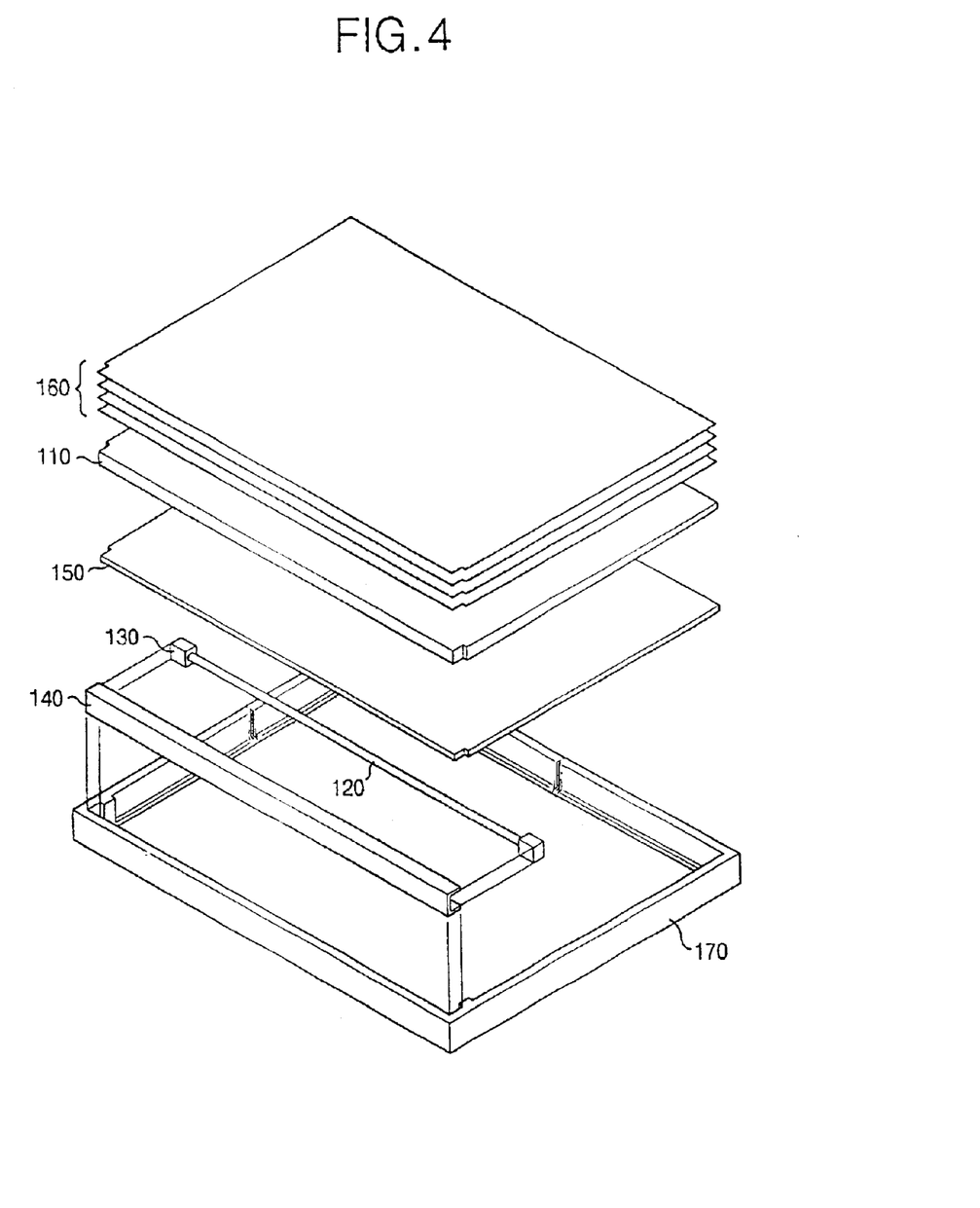
FIG. 4 is a schematic view showing a backlight assembly according to one exemplary embodiment of the present invention.

FIG. 4 is a schematic view showing a backlight assembly according to one exemplary embodiment of the present invention.

Referring to FIG. 4, a backlight assembly according to one exemplary embodiment of the present invention includes a light guiding plate 110, a lamp 120, a lamp holder 130, a lamp cover 140, a reflection plate 150, optical sheets 160 and a receiving container (or mold frame) 170.

The light guiding plate 110 receives light through a light-incident section surface of a side surface of the light guiding plate 110, guides the light and emits the light through a light-emitting section of the upper surface of the light guiding plate 110. The light guiding plate 110 may have a wedge shape, where a first end of the light guiding plate 110 is thicker than a second end of the light guiding plate 110. The light guiding plate 110 may have a flat shape, where a thickness of the first end of the light guiding plate 110 is the same as that of the second end of the light guiding plate 110. The light guiding plate 110 has at least one catching jaw 110a at corner portion thereof.

An electrode is disposed at each end of the lamp 120, and the lamp 120 emits light in response to an external electric power. Each end of the lamp 120 has a hot electrode and a cold electrode, the electric power supplied to the hot electrode is defined as a first electrical power, and the electric power supplied to the cold electrode is defined as a second electrical power.

The lamp holder 130 has a receiving space for receiving the electrode of the lamp 120, and is coupled with a lamp cover 140. The lamp holder 130 coupled with the lamp cover 140 is received at the mode frame 170. The lamp holder 130 comprises a transparent or semi-transparent material, and emits the light emitted from the lamp 120. The lamp holder 130 resists the heat generated from the electrodes of the lamp 120. The lamp holder 130 may comprise a silicone material as a heat-resistant material.

The lamp cover 140 receives the lamp 120 and prevents the light from leaking by coupling with the light guiding plate 110. The lamp cover 140 coupled with the light guiding plate 110 may be a clip type. For example, a clip-type includes a first engagement member that is coupled with the upper surface of the light guiding plate 110 and overlaps with the upper surface of the light guiding plate 110 and a second engagement member that is coupled with the lower surface of the light guiding plate 110 and overlaps with the lower surface of the light guiding plate 110. The length of the first engagement member is preferably less than that of the second engagement member.

The reflection plate 150 is disposed under the light guiding plate 110, and reflects a light leaking through the lower surface of the light guiding plate 110 toward the light guiding plate 110.

The optical sheets 160 are disposed over the light guiding plate 110, and include a diffusion sheet for diffusing light, a lower prism sheet, an upper prism sheet, and a protection sheet. The optical sheets 160 change a path of the light guided by the light guiding plate 110 and emits the light of which path is changed. The lower prism sheet is disposed on the diffusion sheet, and collects the diffused light. The upper prism sheet collects again the light collected by the lower prism sheet.

The receiving container 170 has first, second, third and fourth side surfaces, each side surface has a stepped portion protruded toward inside of the receiving container 170. The receiving container 170 sequentially receives the reflection plate 150, the light guiding plate 110, the lamp cover 140 and the optical sheets 160 on the stepped portions.

Although the reflection plate 150 is disposed on the stepped portions of the receiving container 170 in FIG. 4, the reflection plate 150 may also be disposed under the receiving container 170. For instance, no element such as a lib is placed between the receiving container 170 and the reflection plate 150 so as to dispose the reflection plate 150 below the receiving container 170. Further, a bottom chassis may be installed so as to receive the reflection plate 150 disposed below the receiving container 170.

When the lamp holder 130 comprises an opaque material, dark portions are formed at portions of the LCD panel corresponding to electrodes of the lamp 120. The dark portions corresponding to the electrodes of the lamp 120 may be removed by using the lamp holder 130 that receives both electrodes of the lamp 120 and comprises a transparent or semi-transparent material.

Figure 5:
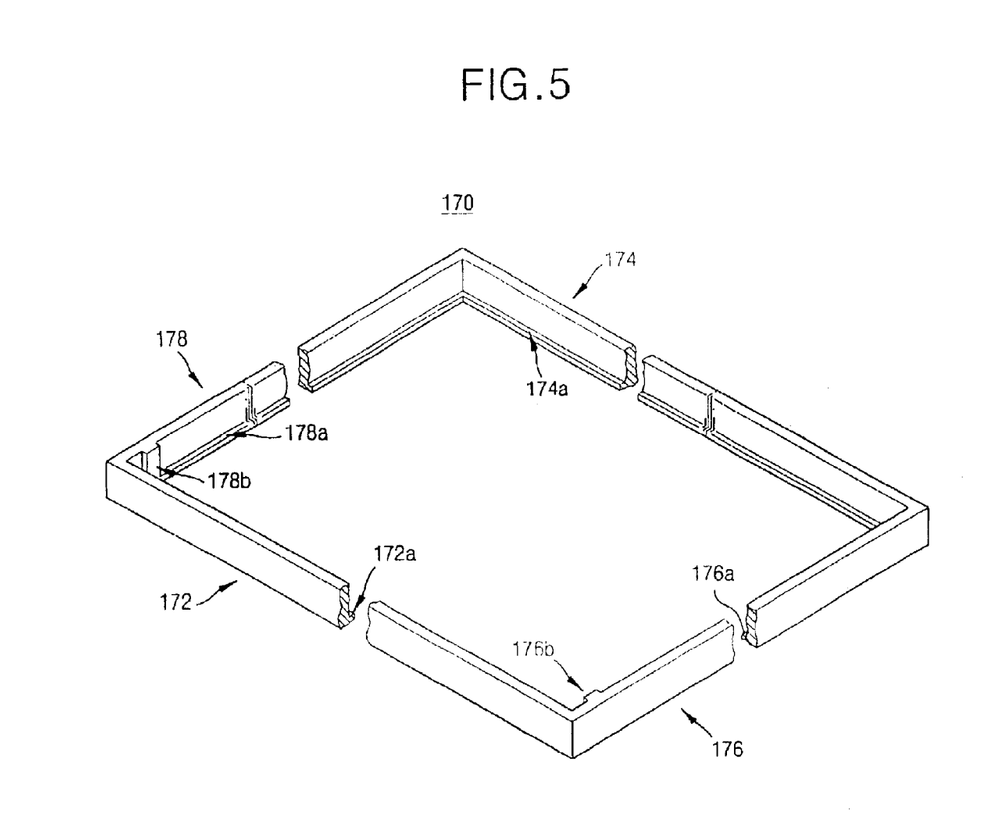
FIG. 5 is a schematic view showing a receiving container of FIG. 4.

FIG. 5 is a schematic view showing a receiving container of FIG. 4.

Referring to FIGS. 4 and 5, the receiving container 170 has first, second, third and fourth side surfaces 172, 174, 176 and 178, respectively, and each side surface 172, 174, 176 and 178 has a stepped portion protruded toward inside of the receiving container 170.

The first side surface 172 is adjacent to the lamp 120, and the second side surface 174 is opposite to the first side surface. The first side surface 172 has a first stepped portion 172a protruded toward inside of the receiving container 170, and supports the lamp cover 140. The second side surface 174 has a second stepped portion 174a protruded toward inside of the receiving container 170, and supports a first end portion of the light guiding plate 110.

A first end portion of the third side surface 176 is connected to a first end portion of the first side surface 172, and a second end portion of the third side surface 176 is connected to a first end portion of the second side surface 174. A first end portion of the fourth side surface 178 is connected to a second end portion of the first side surface 172, and a second end portion of the fourth side surface 178 is connected to a second end portion of the second side surface 174. The third side surface 176 has a third stepped portion 176a protruded toward inside of the receiving container 170, supports a second end portion of the light guiding plate 110 and the reflection plate 150. The fourth side surface 178 has a fourth stepped portion 178a protruded toward inside of the receiving container 170, supports a third end portion of the light guiding plate 110 and the reflection plate 150.

In addition, the third side surface 176 further includes a first protruding member 176b protruded toward inside of the receiving container 170, and prevents fluctuation of the light guiding plate 110 disposed on the third stepped portion 176a. The fourth side surface 178 also further includes a second protruding member 178b protruded toward inside of the receiving container 170, and prevents fluctuation of the light guiding plate 110 disposed on the fourth stepped portion 178a.

Figure 6A:
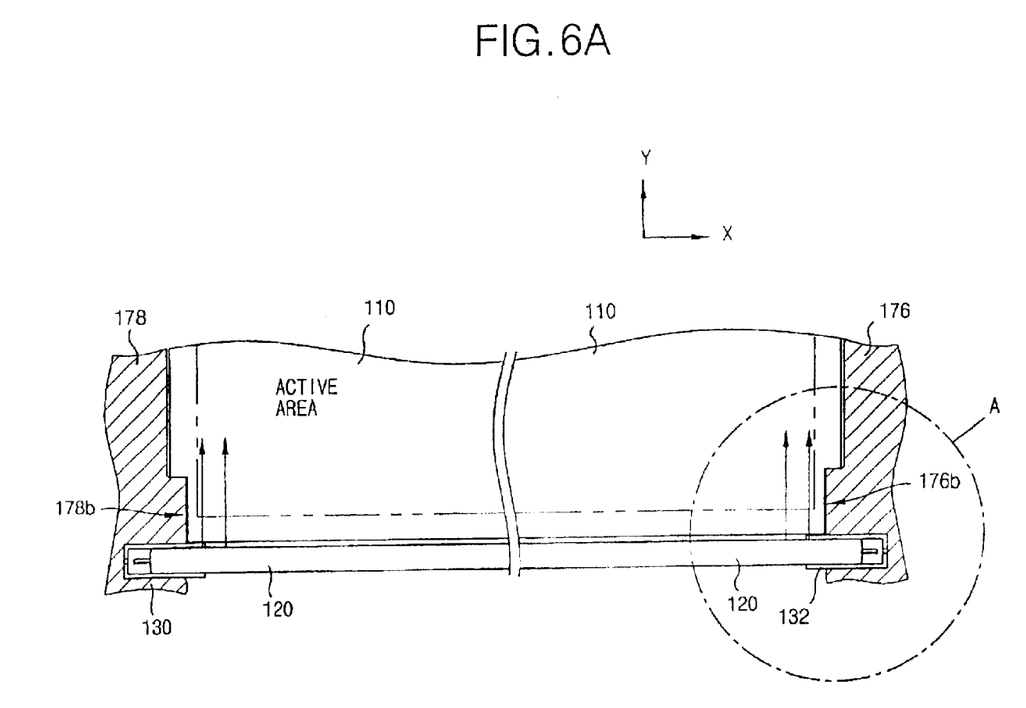
FIGS. 6a and 6b is a schematic view showing an effective and non-effective luminous area of the backlight assembly of FIG. 4.
Figure 6B:
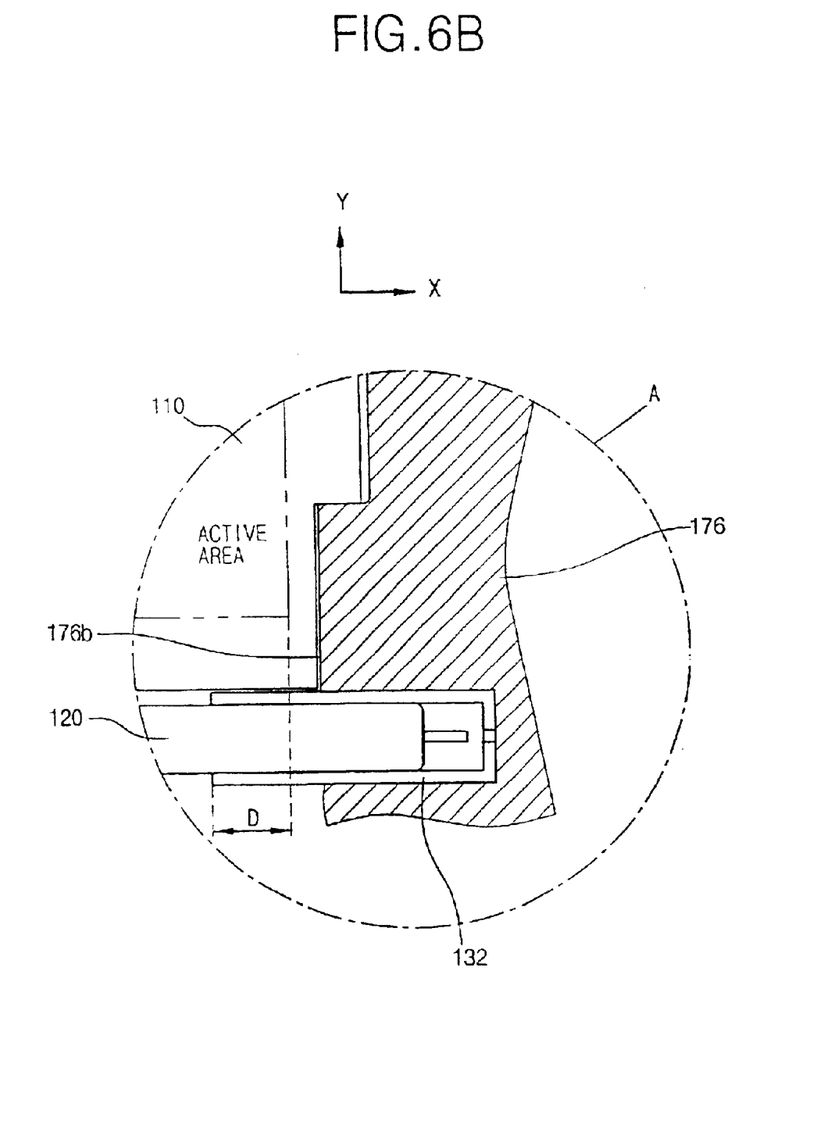

FIG. 6a is a schematic view showing effective and non-effective luminous areas of the backlight assembly of FIG. 4, and FIG. 6b is a magnified view of 'A' portion in FIG. 6a.

Referring to FIG. 6a, the third side surface 176 and the fourth side surface 178 are extended from the side surfaces parallel to a longitudinal direction of the lamp 120 and include the first protruding member 176b, and second protruding member 178b, respectively. The first protruding member 176b or the second protruding member 178b is contacted with a catching jaw 110a and prevents the light guiding plate 110 from fluctuating toward the lamp 120.

In an exemplary embodiment, when the lamp holder comprises two lamp holders 130 and 132 to enclose the end portions of the lamp 120, respectively, a portion of the light emitted from the lamp 120 is incident toward the light guiding plate 110 because each of the lamp holders 130 and 132 comprises transparent or semi-transparent material.

As described above, when a lamp holder in a conventional lamp assembly covers the area that is adjacent to one end of the lamp and disposed on an extension of a reference line defining an effective display area of a light guiding plate, the light from the light guiding plate may not be transmitted through the lamp holder. Thus, the lamp holder is located not to cover the areas, thus, the lamp holder cannot sufficiently support a light-incident surface of the light guiding plate.

However, according to one exemplary embodiment of the present invention, although the lamp holder 132 is further extended from the portion of the lamp adjacent the reference line defining an effective display area by a predetermined length of 'D', the dark portion generated by the lamp holder 132 may be removed. Further, the light-incident surface of the light guiding plate 110 may be sufficiently supported by the lamp holder 132 because the lamp holder 132 comprises a transparent or semi-transparent material.

In another exemplary embodiment, a surface of a transparent or semi-transparent lamp holder may be smoothed in molding the lamp holder to increase a reflection ratio of an inner surface of the lamp holder. As a result, the dark portion corresponding to the electrodes of a lamp may be reduced and brightness of the electrodes of the lamp may be enhanced.

According to the exemplary embodiment of the present invention, the receiving container 170 has protrusion portions 176b and 178b. The protrusion portions 176b and 178b prevent the light guiding plate 110 from fluctuating toward Y-direction when the light guiding plate 110 is pushed to the Y-direction by an external impulse or vibrations.

Figure 7:
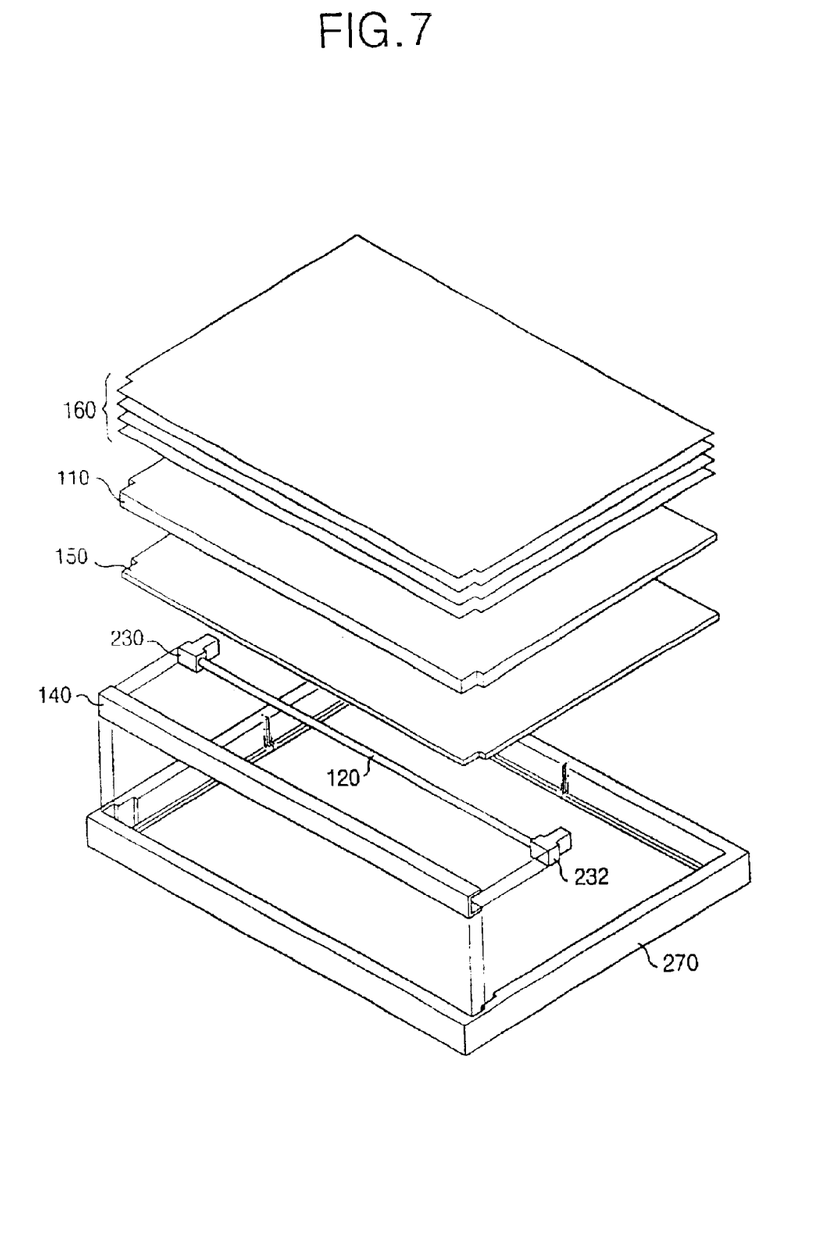
FIG. 7 is a schematic view showing a backlight assembly according to another exemplary embodiment of the present invention.

FIG. 7 is a schematic view showing a backlight assembly according to another exemplary embodiment of the present invention.

Referring to FIG. 7, a backlight assembly according to another exemplary embodiment of the present invention includes a light guiding plate 110, a lamp 120, lamp holders 230 and 232, a lamp cover 140, a reflection plate 150, optical sheets 160 and a receiving container 270. The same reference numerals as that of FIG. 2 are used for the same elements as that of FIG. 2, and explanations will not be repeated for the elements The lamp holders 230 and 232 have a T-shape and a receiving space for receiving the electrode of the lamp 120, respectively. The lamp holders 230 and 232 are coupled with the lamp cover 140, and then are mounted on the receiving container 270. The lamp holders 230 and 232 comprise a transparent or semi-transparent material and emit the light generated from the lamp 120 toward the light guiding plate 110. The lamp holders 230 and 232 comprise a heat-resistance material, for example, a silicon material, to resist the heat generated from the electrodes of the lamp 120.

The receiving container 270 includes first, second, third and fourth side surfaces, each side surface has a stepped portion protruded toward inside of the receiving container 270. The reflection plate 150, the light guiding plate 110, the lamp cover 140 and optical sheets 160 are sequentially received on the protruding portion. The receiving container 270 may further include catching jaws on side surfaces where a lamp assembly comprising the lamp 120, lamp holders 230 and 232, and lamp cover 140 is mounted.

According to another exemplary embodiment, the reflection plate 150 may be disposed under the receiving container 270. In this case, a lib (not shown) of the receiving container 270 may be removed so as to remove any element between the receiving container 170 and the reflection plate 150, and a bottom chassis may be installed so as to receive the reflection plate 150.

The lamp holders 230 and 232 have the T-shape in FIG. 7, but the lamp holder 230 and 232 may also have a Y-shape or arrow shape, etc. In addition, although the side surfaces of the receiving container 270 are closed in FIG. 7 or 8, the side surfaces of the receiving container 270 adjacent to the lamp holders 230 and 232 may be partially opened, to thereby easily transfer the heat generated from the lamp 120 to outside of the receiving container 270.

Figure 8:
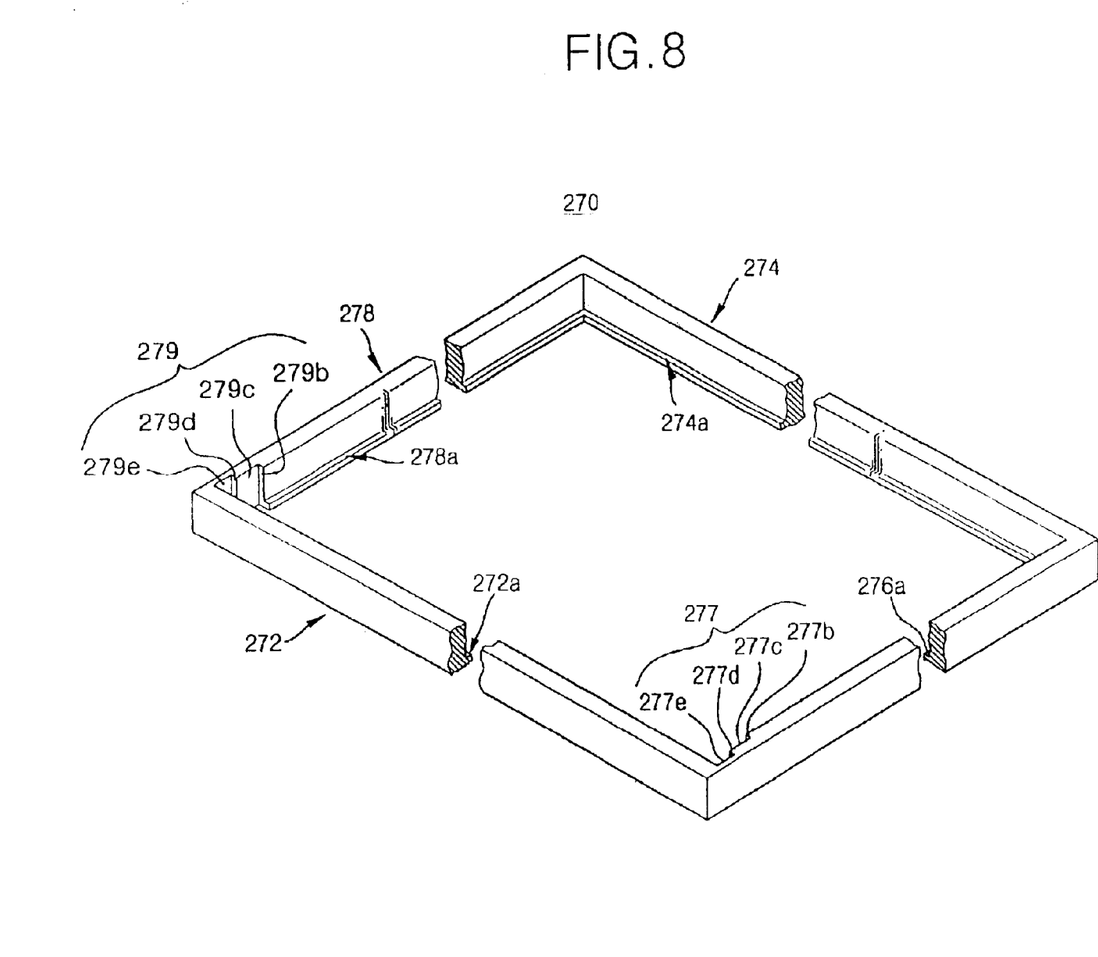
FIG. 8 is a schematic view showing a receiving container of FIG. 7.

FIG. 8 is a schematic view showing a receiving container of FIG. 7.

Referring to FIG. 8, the receiving container 270 has first, second, third and fourth side surfaces 272, 274, 276 and 278, respectively, and each side surface 272, 274, 276 or 278 has a stepped portion protruded toward the inside of the receiving container 270.

The first side surface 272 is adjacent to the lamp 120, and the second side surface 274 is opposite to the first side surface 272. The first side surface 272 has a first stepped portion 272a protruded toward the inside of the receiving container 270, and supports the lamp cover 140. The second side surface 274 has a second stepped portion 274a protruded toward the inside of the receiving container 270, and supports the first end portion of the light guiding plate 110.

A first end portion of the third side surface 276 is connected to a first end portion of the first side surface 272, and a second end portion of the third side surface 276 is connected to a first end portion of the second side surface 274. A first end portion of the fourth side surface 278 is connected to a second end portion of the first side surface 272, and a second end portion of the fourth side surface 278 is connected to a second end portion of the second side surface 274. The third side surface 276 has a third stepped portion 276a protruded toward the inside of the receiving container 270, supports the second end portion of the light guiding plate 110 and the reflection plate 150. The fourth side surface 278 has a fourth stepped portion 278a protruded toward the inside of the receiving container 270, supports the third end portion of the light guiding plate 110 and the reflection plate 150.

In addition, the third side surface 276 further includes a first catching jaw 277 having first to fourth side walls 277b, 277c, 277d and 277e. When the lamp holder 230 has a first T-shape lamp holder, one portion of the first T-shape lamp holder 230 is inserted into the side walls 277b, 277c, 277d and 277e of the first catching jaw 277, and other portion of the first T-shape lamp holder 230 is contacted with a catching jaw 110a and prevents fluctuation of the light guiding plate 110 disposed on the third stepped portion 276a.

The fourth side surface 278 further includes a second catching jaw 279 having first to fourth side walls 279b, 279c, 279d and 279e. When the lamp holder 232 has a second T-shape lamp holder, one portion of the second T-shape lamp holder 232 is inserted into the side walls 279b, 279c, 279d and 279e of the second catching jaw 279, and other portion of the second T-shape lamp holder 232 is contacted with a catching jaw 110a and prevents fluctuation of the light guiding plate 110 disposed on the fourth stepped portion 278a. The first, second, third and fourth side walls 279b, 279c, 279d and 279e of the second catching jaw 279 are formed as a shape of grooves on the fourth side surface 278, the side walls 279b, 279c, 279d and 279e contact with side walls of the second T-shape lamp holder 232. The first, second, third and fourth side walls 277b, 277c, 277d and 277e of the first catching jaw 277 are formed as a shape of grooves on the third side surface 276, and the side walls 277b, 277c, 277d and 277e contact with side walls of the first T-shape lamp holder 230.

Figure 9:
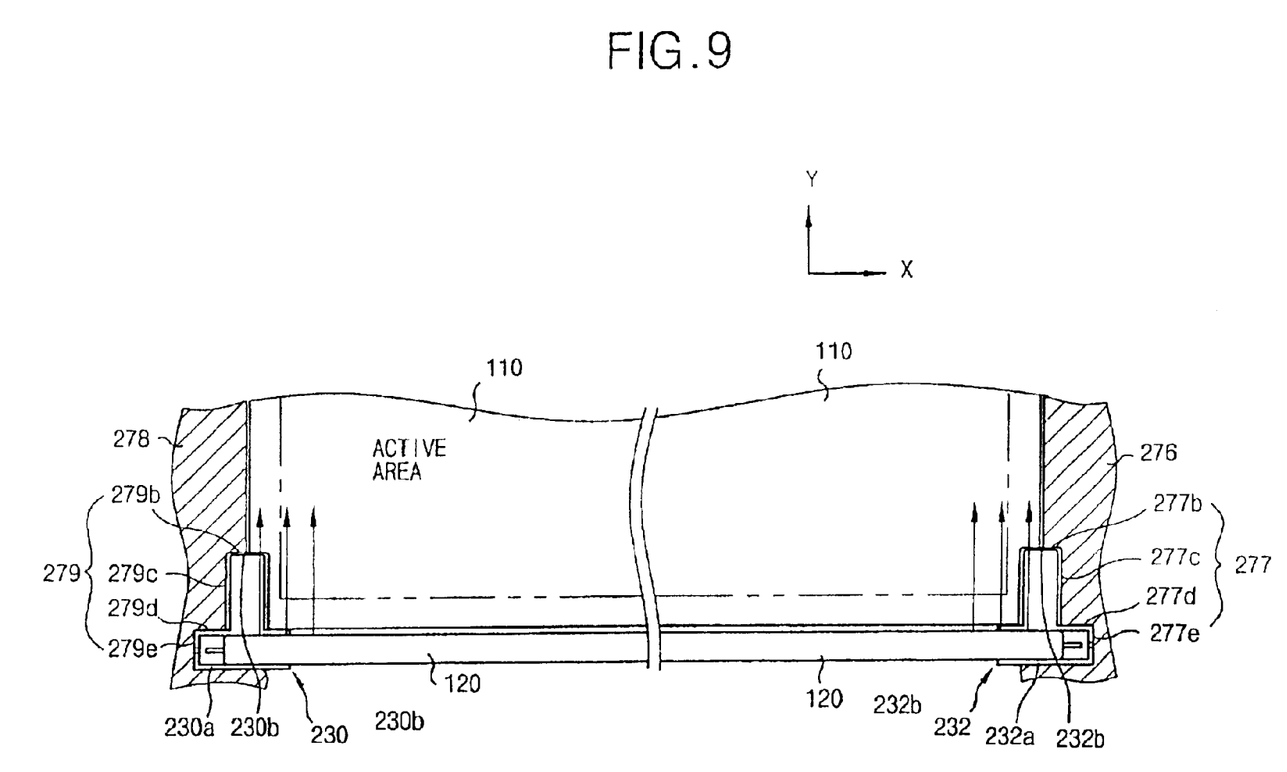
FIG. 9 is a schematic view showing an effective and non-effective luminous area of the backlight assembly of FIG. 7.

FIG. 9 is a schematic view showing effective and non-effective luminous areas of the backlight assembly of FIG. 7.

Referring to FIG. 9, the third side surface 276 and the fourth side surface 278 are extended from the side surfaces parallel to a longitudinal direction of the lamp 120, and include the catching jaws 277 and 279, respectively. The catching jaws 277 and 279 prevent the light guiding plate 110 from fluctuating toward the lamp 120.

In addition, although first members 230a and 232a of the two lamp holders 230 and 232 respectively enclose the end portions of the lamp 120, respectively, the light emitted from the lamp 120 is incident toward the light guiding plate 110 because each of the lamp holders 230 and 232 comprises a transparent or semi-transparent material.

According to the exemplary embodiment of the present invention, although the lamp holder 230 is further extended from the portion of the lamp 120 (that is adjacent to one end of the lamp 120 and disposed on the extension of the reference line defining the effective display area of the light guiding plate 110) by a predetermined length, the dark portion generated by the lamp holder 230 may be removed. Also, the light-incident surface of the light guiding plate 110 may be sufficiently supported by the lamp holder 230 because the lamp holder 230 comprises a transparent or semi-transparent material.

In addition, the dark portion corresponding to the electrodes of the lamp may be reduced and the brightness of the electrodes of the lamp may be enhanced when a reflection ratio of an inner surface of the transparent or semi-transparent lamp holder 230 is increased by smoothening the surface of the lamp holder 230 in molding the lamp holder 230.

In addition, the transparent or semi-transparent lamp holders 230 and 232 according to the exemplary embodiment prevent the fluctuation of the light guiding plate 110 without preventing light transmission, thereby reducing the dark portions corresponding to the electrodes of the lamp and enhancing the brightness of the electrodes of the lamp.

As shown in FIG. 9, the receiving container 270 has the catching jaws 277 and 279 for receiving the T-shape lamp holders 230 and 232 in which one portions of second members 230b and 232b in the T-shape lamp holders 230 and 232 are received in the catching jaws 277 and 279, and other portions of second members 230b and 232b in the T-shape lamp holders 230 and 232 prevent fluctuation of the light guiding plate 110. According to another embodiment, the lamp holder 230 or 232 may have other shape than the T-shape. For example, the lamp holder may be L-shape that prevents fluctuation of the light guiding plate 110 as a whole.

Figure 10:
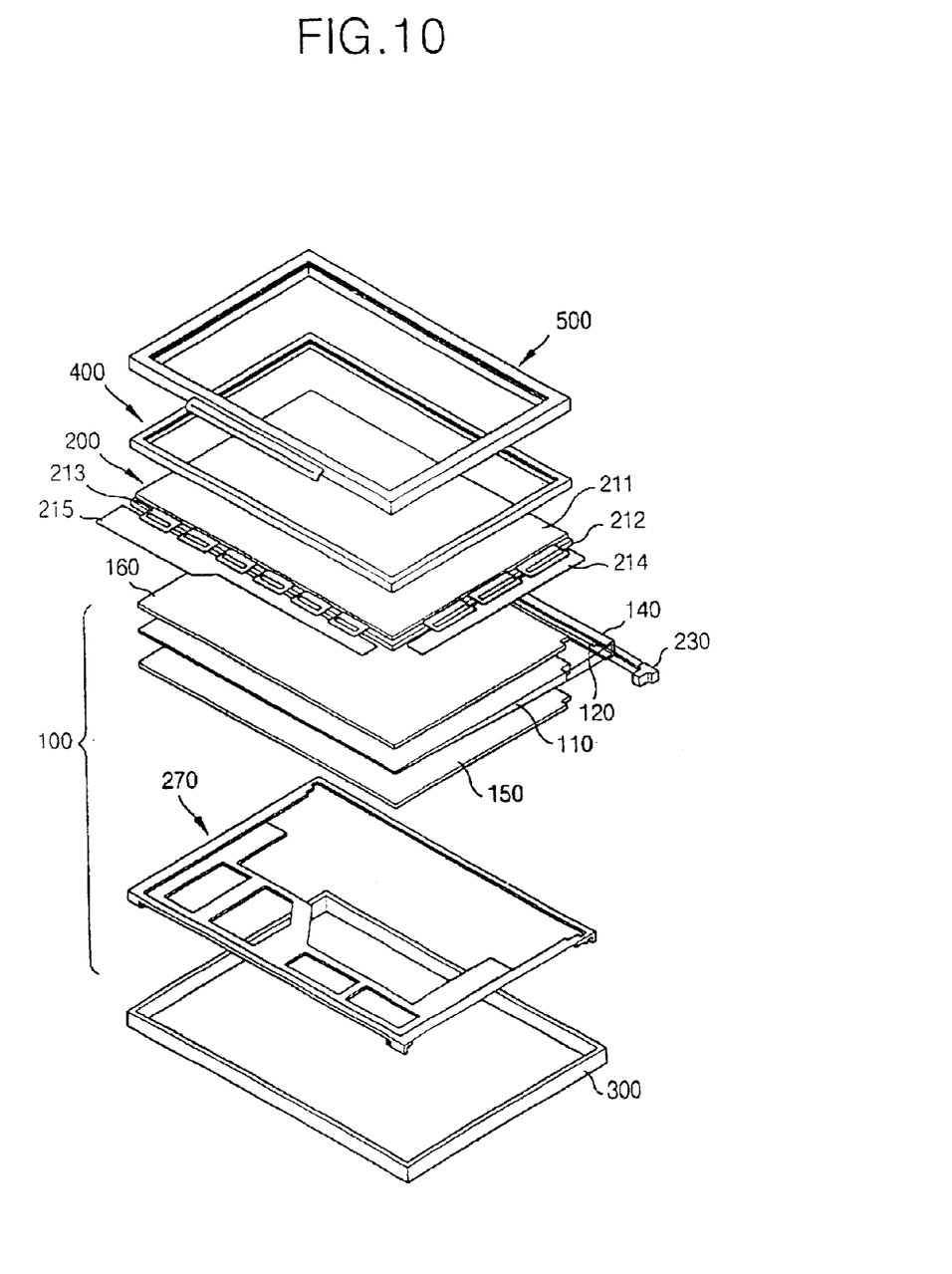
FIG. 10 is a schematic view showing a LCD having a backlight assembly according to one exemplary embodiment of the present invention.

FIG. 10 is a schematic view showing a LCD having a backlight assembly according to one exemplary embodiment of the present invention.

Referring to FIG. 10, a LCD according to an exemplary embodiment of the present invention includes a backlight assembly 100, a display unit 200, a bottom chassis 300, a top chassis 400 and a front case 500.

The backlight assembly 100 includes the light guiding plate 110, the lamp 120, the lamp holder 230, the lamp cover 140, the reflection plate 150 and the optical sheets 160, and is received in the receiving container 270. The light guiding plate 110 guides light and changes the path of light, and the lamp 120 is disposed at one side surface of the light guiding plate 110 and generates the light. The lamp holder 230 receives the electrode of the lamp 120, and the lamp cover 140 prevents the light generated by the lamp 120 from leaking. The reflection plate 150 is disposed under the light guiding plate 110 and reflects back the light leaked from the light guiding plate 110 to the light guiding plate 110, to thereby enhance light efficiency. The brightness of the light emitted from the light guiding plate 110 is uniform through the optical sheets 160. Hereinafter, a detailed description about the backlight assembly 100 will not repeated because the detailed description about the backlight assembly 100 was given in FIG. 5 and FIG. 6.

The display unit 200 is disposed on the backlight assembly 100, and displays an image by using the light emitted from the backlight assembly 100. The display unit 200 includes a LCD panel 211, gate and data PCBs (Printed Circuit Board; 212 and 213) and gate and data tape carrier packages 214 and 215.

The bottom chassis 300 receives the backlight assembly 100 and the display unit 200 by engaging with the top chassis 400.

The front case 500 engages with a rear case (not shown) disposed under the bottom chassis 300, and the LCD is assembled completely.

Accordingly, an edge type backlight assembly according to the present invention may reduce the dark portion corresponding to the electrodes of a lamp and enhance the brightness of electrodes of the lamp by improving the material and structure of a lamp holder.

Further, the dark portion corresponding to the electrodes of a lamp may be reduced and the brightness of a backlight assembly may be enhanced, when a reflection ratio of an inner surface of a transparent or semi-transparent lamp holder according to an exemplary embodiment is increased by smoothening the surface of the lamp holder in molding the lamp holder.

Still further, since a backlight assembly uses a transparent or semi-transparent lamp holder on the side surfaces of a receiving container, the lamp holder does not prevent the light transmission, thereby reducing the dark portions corresponding to the electrodes of a lamp and enhancing the brightness of the electrodes of the lamp.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A lamp assembly, comprising:
   a lamp having a first electrode disposed on a first end of the lamp to receive a first electric power and a second electrode disposed on a second end of the lamp for to receive a second electric power, the lamp emitting a light in response to the first and second electric powers; and
   a lamp holder to receive at least one of the first and second end of the lamp and to transmit the light therethrough emitted from the lamp.

2. The lamp assembly of claim 1, wherein the lamp holder comprises at least one of a transparent material and a semitransparent material.

3. The lamp assembly of claim 2, wherein the transparent material comprises a transparent silicone material, and the semitransparent material comprises a semitransparent silicone material.

4. The lamp assembly of claim 3, wherein the lamp holder comprises a flame retardant mixed with at least one of the transparent silicone material and the semitransparent silicone material in order to resist heat generated from the lamp.

5. The lamp assembly of claim 3, wherein the lamp holder comprises a hardness regulating agent mixed with at least one of the transparent silicone material and the semitransparent silicone material.

6. The lamp assembly of claim 1, further comprising:
   a lamp cover configured to couple with the lamp holder receiving the lamp, and preventing a leakage of the light emitted from the lamp.

7. A backlight assembly, comprising:
   a lamp assembly having a lamp to emit a first light and a lamp holder to receive at least one end of the lamp, the lamp holder receiving the first light emitted from the lamp and transmitting the received first light therethrough as a second light;
   a light guiding plate to guide the first light emitted from the lamp and the second light emitted through the lamp holder and to emit a third light; and
   a receiving container to receive the lamp assembly and the light guiding plate.

8. The backlight assembly of claim 7, wherein the receiving container comprises a stepped portion on a side wall on which the light guiding plate is mounted.

9. The backlight assembly of claim 7, wherein the lamp holder comprises a receiving space to receive said at least one end of the lamp, and wherein the lamp holder covers a portion of the lamp disposed on an extension of a reference line defining an effective display area of the light guiding plate.

10. The backlight assembly of claim 7, wherein the receiving container comprises first, second, third and fourth side walls, the first side wall being disposed adjacent the lamp, the second side wall being opposite to the first side wall, the third and fourth side walls connecting with the first side wall and the second side wall, respectively,
   wherein at least one of the third and fourth side walls comprises a protruding member projected inward the receiving container to prevent fluctuation of the light guiding plate in the receiving container.

11. The backlight assembly of claim 7, wherein the lamp holder comprises:
   a first member comprising the receiving space to receive the at least one end of the lamp; and
   a second member projected from a surface of the first member and contacted with a catching jaw of the light guiding plate to prevent fluctuation of the light guiding plate.

12. The backlight assembly of claim 7, wherein the receiving container comprises first, second, third and fourth side walls, the first side wall being disposed adjacent the lamp, the second side wall being opposite to the first side wall, the third and fourth side walls connecting with the first and second side walls, respectively, and
   wherein at least one of the third and fourth side walls comprises a first catching jaw that forms a shape of grooves.

13. The backlight assembly of claim 12, wherein the lamp holder comprises:
   a first member to receive at least one end of the lamp; and
   a second member being projected from a surface of the first member, wherein one portion of the second member is inserted in the first catching jaw and other portion of the second member contacts a second catching jaw of the light guiding plate to prevent fluctuation of the light guiding plate.

14. The backlight assembly of claim 11, wherein a thickness of the second member is substantially identical to or greater than a width of the light guiding plate.

15. The backlight assembly of claim 14, further comprising an optical sheet, and wherein the thickness of the second member is less than a total width made by adding the width of the light guiding plate and a width of the optical sheet.

16. The light guide plate of claim 7, wherein the light guiding plate has a wedged shape.

17. The light guide plate of claim 7, wherein the light guiding plate has a flat shape.

18. The light guide plate of claim 7, wherein the lamp holder comprises at least one of a transparent material and a semitransparent material.

19. The light guide plate of claim 18, wherein the transparent material comprises a transparent silicone material, and the semitransparent material comprises a semitransparent silicone material.

20. The light guide plate of claim 19, wherein the lamp holder comprises a flame retardant mixed with at least one of the transparent silicone material and the semitransparent silicone material in order to resist heat generated from the lamp.

21. The light guide plate of claim 19, wherein the lamp holder comprises a hardness-regulating agent mixed with at least one of the transparent silicone material and the semitransparent silicone material.

22. A liquid crystal display apparatus, comprising:
a backlight unit including a lamp assembly having a lamp holder receive at least one end of a lamp which emits a light in response to an external electric power, the lamp holder receiving a portion of the light emitted from the lamp and transmitting the portion of the light therethrough, a light guiding plate to guide the light emitted from the lamp and the portion of the light provided through the lamp holder, and a receiving container to receive the lamp assembly and the light guiding plate; and
a display unit to display an image in response to the light emitted from the backlight unit.

23. The liquid crystal display apparatus of claim 22, wherein the light guiding plate has a first effective display area corresponding to a second effective display area of the display unit, and wherein the lamp holder receives said the at least one end of the lamp such that the lamp holder covers a portion of the lamp adjacent to said the at least one end of the lamp and disposed on an extension of a reference line defining the first effective display area of the light guiding plate.

24. The liquid crystal display apparatus of claim 22, wherein the receiving container comprises first, second, third and fourth side walls, the first side wall being disposed adjacent the lamp, the second side wall being opposite to the first side wall, the third and fourth side walls connecting with the first side wall and the second side wall, respectively,
wherein at least one of tho third and fourth side walls comprises a protruding member projected inward the receiving container to prevent fluctuation of the light guiding plate.

* * * * *